United States Patent

Mooney et al.

[11] 3,988,005
[45] Oct. 26, 1976

[54] LOAD BINDER AND CHAIN ASSEMBLY

[76] Inventors: Gerald R. Mooney, 3080 Eldogor Lane, New Castle, Pa. 16105; Louis A. Mooney, 1002 Ryan Ave., New Castle, Pa. 16101

[22] Filed: Sept. 18, 1975

[21] Appl. No.: 614,525

[52] U.S. Cl. .............................. 254/78; 24/68 CD; 24/168 CT
[51] Int. Cl.² ............................................ B66F 3/00
[58] Field of Search......... 254/78; 24/68 CD, 68 CT

[56] References Cited
UNITED STATES PATENTS

| | | | |
|---|---|---|---|
| 524,663 | 8/1894 | Barber | 24/68 CT |
| 2,201,394 | 5/1940 | Edelblute | 254/78 |
| 2,422,001 | 6/1947 | Durbin | 254/78 |
| 2,621,020 | 12/1952 | Call | 254/78 |
| 3,229,952 | 1/1966 | Zumbo | 24/68 CT |
| 3,426,996 | 2/1969 | Broling | 254/78 |

Primary Examiner—Al Lawrence Smith
Assistant Examiner—Robert C. Watson
Attorney, Agent, or Firm—Colton & Stone, Inc.

[57] ABSTRACT

In a chain and load binder assembly for securing a load to a vehicle, the load binder is captively connected to the chain to prevent the loss or theft thereof. A grab link having a central opening through which the chain passes freely and a slot extending from the opening and receiving a single link of the chain connects the binder to the chain. One end of the chain is permanently attached to the vehicle and the opposite end has a hook which does not pass through the central opening of the grab link.

1 Claim, 6 Drawing Figures

LOAD BINDER AND CHAIN ASSEMBLY

BACKGROUND OF THE INVENTION

The present invention relates to load tie-down systems for vehicles and, more particularly, to an improved load binder and chain assembly for use in such systems.

The use of chains and load binders to secure loads to vehicles such as flat bed trailers and railway flat cars is a common practice. Typically, a chain of a length greater than that required to pass over the load is connected at one of its ends to the vehicle bed, passed over the load, and connected at its opposite end to the vehicle bed. In order to tighten the chain, securing the load to the vehicle, a load binder is employed. Examples of load binders are shown in U.S. Pat. Nos. 1,758,039; 1,885,128; and 3,149,821. Typically, these devices have a pair of hooks for engaging the chain at two spaced points and a linkage arrangement connecting the two hooks and operable to pull the hooks toward one another to tighten the chains about the load. It is the usual practice to carry the load binders and chains on the vehicle when not carrying a load and a frequently encountered problem is the accidental loss or theft of the load binders.

While, from the standpoint of preventing loss of the load binders, it would be desirable to permanently attach the load binders to the chain lengths so that the binder and chain constitute a unit which may be securely attached to the vehicle bed; such an arrangement is not generally feasible since loads of widely varying dimensions may be carried, requiring the load binder to be adjustably positional along the length of the chain.

It is the primary object of the present invention to provide a chain and load binder arrangement in which the load binder is permanently attached to the chain and thus not easily removed or lost.

Another object of the invention is the provision of a load binder and chain assembly in which the load binder is captive on one of the chains but, nevertheless, readily movable along the chain length.

BRIEF DESCRIPTION OF THE INVENTION

The above and other objects of the invention which will become apparent in the following detailed description are achieved by the provision of a load binder and chain assembly for a vehicle in which the chain is permanently attached to the vehicle and one of the load binder connections to the chain is by means of a link having a central opening through which the chain may be freely passed and a slot extending tangentially from the opening and of a width such that an individual link of the chain is retained therein with the adjacent links preventing movement of the chain therethrough. A hook or enlarged link is provided on the free end of the chain and is so dimensioned as to prevent removal of the load binder from the chain.

For a more complete understanding of the invention and the objects and advantages thereof, reference should be had to the following description and the accompanying drawings wherein there is shown a prepared embodiment of the invention.

DETAILED DESCRIPTION OF THE PREFERRED EMBODIMENT

Figure 1:
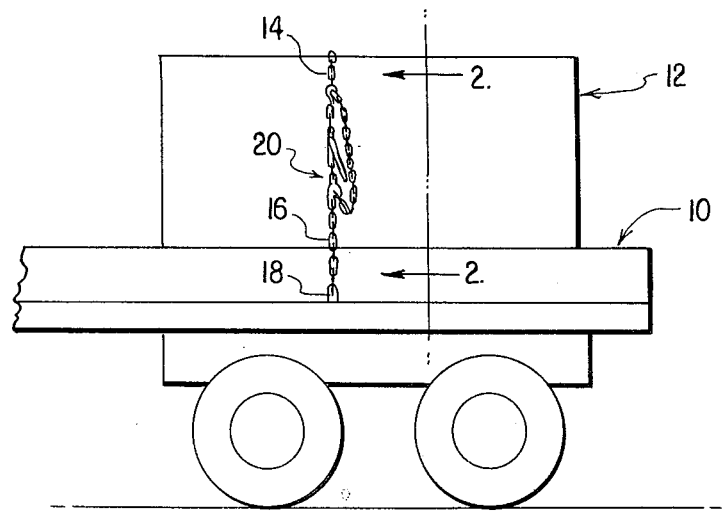
FIG. 1 is a fragmentary side elevational view of a flat bed trailer having a load secured thereto by means of the load binder and chain assembly of the present invention.
Figure 5:
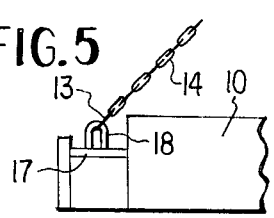
FIGS. 5 and 6 are fragmentary elevational views of the connections of the chain ends to the vehicle bed.
Figure 6:
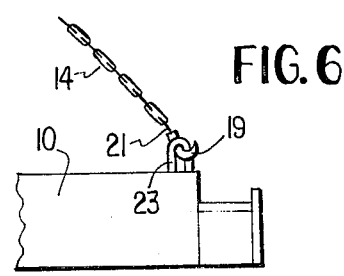

Referring first to FIG. 1, the reference numeral 10 designates generally a flat bed trailer on which is positioned a load 12. The load 12 is secured to the trailer by means of a binder chain 14. One end of the chain 14 is permanently attached to the trailer 10, for example, by having the end link thereof welded to the trailer or, as is shown in FIG. 5, by means of an anchor assembly which is movable along the length of the trailer. The latter arrangement may be of the type described and claimed in our patent application entitled Load Tie-Down System, Ser. No. 579,621, filed May 21, 1975. In this arrangement, a U-bolt 18 connects the end link 13 of the chain 14 to an anchor assembly 17 which is permanently connected to the vehicle bed but which may be moved along the length thereof and retained in any of a plurality of positions. The opposite end of the chain, shown in FIG. 6, has a hook 19 permanently secured to the end link 21 of the chain. The hook 19 engages any suitable securement point 23 on the trailer 10, the securement point 23 being on the opposite side of the trailer from the anchor assembly 17.

After the chain 14 has been positioned over the load 12 and the hook 19 at the free end thereof attached to the securement point 23, a load binder assembly 20 is connected to the chain 14 to tighten it about the load. Typical load binders of the prior art have two hooks for engaging the chain at spaced points and a linkage arrangement connecting the two hooks and operable to draw the hooks toward one another, thereby tightening the chain about the load. As was discussed above, load binders which employ hooks at both points of the engagement with the chain may easily become separated from the chain when not in use and lost or stolen. Permanent attachment of one of the load binder links to a fixed point along the chain is not desirable, however, since various sizes and configurations of loads make it preferrable to be able to vary the points of attachment of the load binder to the chain.

Figure 2:
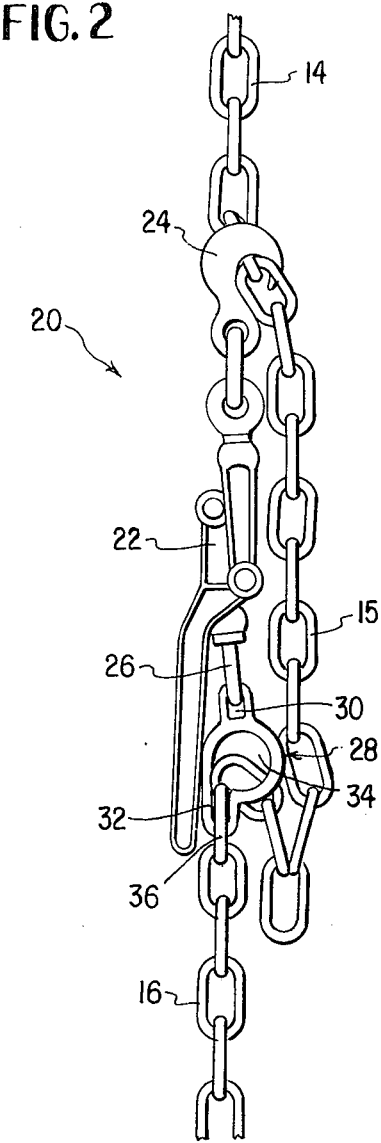
FIG. 2 is a fragmentary view taken along the line 2—2 of FIG. 1 and showing, on an enlarged scale, the load binder and chain assembly.
Figure 3:
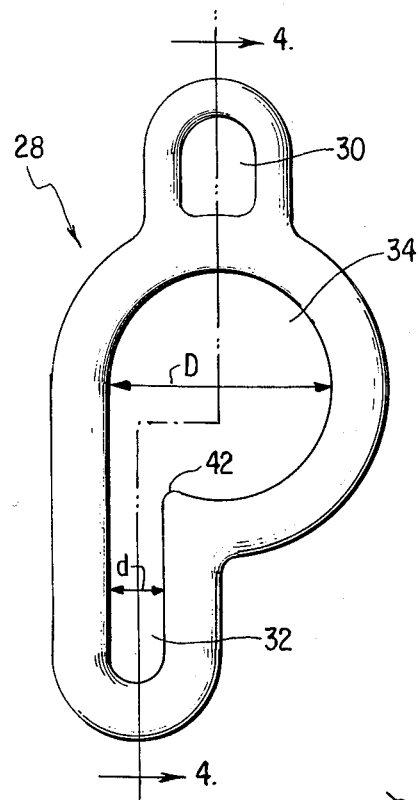
FIG. 3 is a plan view of a grab link forming a part of the assembly of FIGS. 1 and 2.
Figure 4:
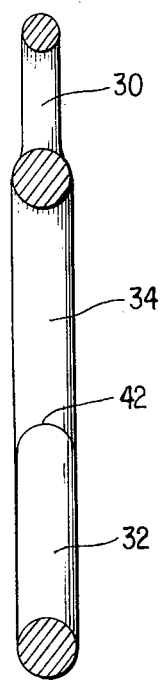
FIG. 4 is a transverse sectional view taken along the line 4—4 of FIG. 3.

In order to prevent the loss of a load binder when not in use, while retaining the ability to move the point of attachment of the load binder on the chain when securing a load, the arrangement shown in FIG. 2 is employed. In this arrangement, a conventional hook 24 is provided on one of the links of the load binder 22. The opposite link of the load binder, however, is attached by means of a swivel link 26 to a grab link 28, the link 26 being permanently attached to an eye 30 forming a part of the grab link 28. As can be seen from FIGS. 3 and 4, the grab link 28 has a central opening 34 of generally circular configuration and of a diameter D such that the links of the chain 14 will pass freely therethrough. The diameter D of the central opening 34 of the link 28 is, however, less than the maximum width of the hook 19 at the free end of the chain 14 so that the hook 19 cannot pass through the opening 34. A slot 32 extends tangentially outward from the opening 34, the slot being of a width $d$ only slightly greater than the thickness of a link of the chain 14 and of a length approximately equal to the width of an individual chain link. It should be noted that the portion 42 of the link at the point of entry of the slot 32 into the central opening 34 generally follows the curvature of the sides of the central opening.

Initial assembly of the load binder and chain arrangement is accomplished by threading the chain length 14 through the opening 34 of the grab link 28, permanently connecting one end of the chain to the vehicle mounted anchor point 18, and permanently attaching the hook 19 to the opposite end of the chain 14. When a load is to be secured, the chain 14, as was previously described, is passed over the load, the load binder 22 moved along the chain 14 with the chain passing through the opening 34 of the grab link 28 until the desired position is reached, the chain 14 and grab link 28 then manipulated so that an individual link 36 of the chain 14 is received in the slot 32, and the hook 24 at the opposite end of the load binder 22 engaged with the chain 14 at a point spaced from the point of engagement between the grab link 28 and the chain. The chain 14 is thus divided into three sections, a first chain length 14a from one end of the chain to the load binder hook 24, a second chain length 16 from the opposite end of the chain to the grab link 28, and an intermediate chain length 15 between the hook 24 and grab link 28. Upon tightening of the load binder 22, the first and second chain lengths 14a and 16 are drawn toward one another, securing the load 12 on the vehicle 10. The excess length of the chain 14 becomes the slack intermediate portion 15. When the load binder 22 has been tightened, the resulting tension on the chain holds the link 36 of the chain 14 in the slot 32, the adjacent link of the chain engaging the side of the grab link to prevent the chain 14 from sliding through the grab link 28.

Since the slot 32 extends tangentially from the central opening 34 and the portion 42 follows the curvature of the central opening, a chain does not tend to catch or snag in the slot 32 when being passed through the grab link.

It should be understood that while a preferred embodiment of the invention has been described in detail, the invention is not limited to the specifically described embodiment. Reference should be had to the following claims in determining the true scope of the invention.

What is claimed is:

1. A chain and load binder assembly for securing a load to a bed of a vehicle, comprising:
    a chain of a length greater than that required to extend from a first point on said vehicle bed and at one side of said load, over said load, and to a second point on said vehicle bed and at the opposite side of said load from said first point;
    a load binder having first and second attachment means permanently secured thereto for connecting said load binder to two spaced points along said chain, one of said attachment means comprising a member having a central opening through which the links of said chain pass freely and a slot communicating with and extending from said opening, said slot being of such dimensions as to receive an individual link of said chain and to prevent adjacent chain links from passing therethrough;
    first securement means permanently connecting one end of said chain to said first point on said vehicle bed; and
    second securement means detachably connecting the other end of said chain to said second point on said vehicle bed, said second securement means including a member of greater width than said opening of said attachment means whereby said attachment means and said load binder are captively retained on said chain.

* * * * *